United States Patent [19]

Hughes

[11] Patent Number: 4,905,204
[45] Date of Patent: Feb. 27, 1990

[54] METHOD OF WEIGHTING A TRACE STACK FROM A PLURALITY OF INPUT TRACES

[75] Inventor: Phillip A. Hughes, Houston, Tex.

[73] Assignee: Exxon Production Research Company, Houston, Tex.

[21] Appl. No.: 379,488

[22] Filed: Jul. 13, 1989

Related U.S. Application Data

[62] Division of Ser. No. 240,956, Sep. 6, 1988, Pat. No. 4,882,713.

[51] Int. Cl.$^4$ .............................................. G01V 1/28
[52] U.S. Cl. .................................... 367/62; 367/38; 364/421
[58] Field of Search .................. 364/421; 367/62, 38, 367/47, 63, 46

[56] References Cited

U.S. PATENT DOCUMENTS

| | | | |
|---|---|---|---|
| 2,688,124 | 8/1954 | Doty et al. | 367/41 |
| 3,213,411 | 10/1965 | Loring | 367/40 |
| 3,275,980 | 9/1966 | Foster | 367/46 |
| 3,363,229 | 1/1968 | Miller, Jr. et al. | 367/43 |
| 3,373,426 | 3/1968 | Miller, Jr. | 342/109 |
| 3,398,396 | 8/1968 | Embree | 367/46 |
| 3,413,473 | 11/1968 | Mills, Jr. | 250/262 |
| 3,689,874 | 9/1972 | Foster et al. | 367/46 |
| 3,731,268 | 5/1973 | Landrum, Jr. | 367/41 |
| 3,744,019 | 7/1973 | Schmitt | 367/60 |
| 3,806,864 | 4/1974 | Broding et al. | 367/77 |
| 3,894,222 | 7/1975 | Siems | 367/45 |
| 3,946,357 | 3/1976 | Weinstein et al. | 367/77 |
| 3,968,471 | 7/1976 | Savit | 367/39 |
| 4,147,228 | 4/1979 | Bouyoncos | 181/119 |
| 4,218,766 | 8/1980 | Parrack et al. | 367/47 |
| 4,314,347 | 2/1982 | Stokely | 367/47 |
| 4,344,158 | 8/1982 | Landrum, Jr. et al. | 367/73 |
| 4,397,006 | 8/1983 | Galbraith, Jr. | 367/40 |
| 4,468,761 | 8/1984 | Rietsch | 367/43 |
| 4,503,527 | 3/1985 | Pann | 367/53 |
| 4,532,618 | 7/1985 | Wener | 367/46 |
| 4,561,074 | 12/1985 | Warmack | 367/46 |
| 4,561,075 | 12/1985 | Smith et al. | 367/46 |

FOREIGN PATENT DOCUMENTS

0051916B1 4/1986 European Pat. Off.

OTHER PUBLICATIONS

"Statistically Optimal Stacking of Seismic Data", Robinson, Geophysics, June 1970.
"Wave Equation Migration with Accurate Space Derivative Method" by J. Gazdag, Geophysical Prospecting, 1980, 28, 60–70.
"Stacking Methods other than Simple Summation", O. E. Naess and L. Bruland, Chpt. 6, Developments in Geophysical Exploration Methods, Elsevier Applied Science Publishers, Ltd., N.Y., 1985.
"A Guided Tour of the Fast Fourier Transform", G. D. Bergland, IEEE Spectrum, Jul. 1969, pp. 41–52.
"Noise Suppression Stack, User's Guide", P. A. Hughes, EPR Proprietary 05.86.

Primary Examiner—Thomas H. Tarcza
Assistant Examiner—Ian J. Lobo
Attorney, Agent, or Firm—Frank S. Vaden, III

[57] ABSTRACT

A method is disclosed for developing a weight function for a trace stack from the weight functions derived from the respective weight functions of an ensemble of individual separate input traces. Also disclosed is the method of developing the resulting weighted trace stack. Finally, disclosed also is a method of noise suppression utilizing weight function manipulation from a plurality of related seismic traces.

3 Claims, 9 Drawing Sheets

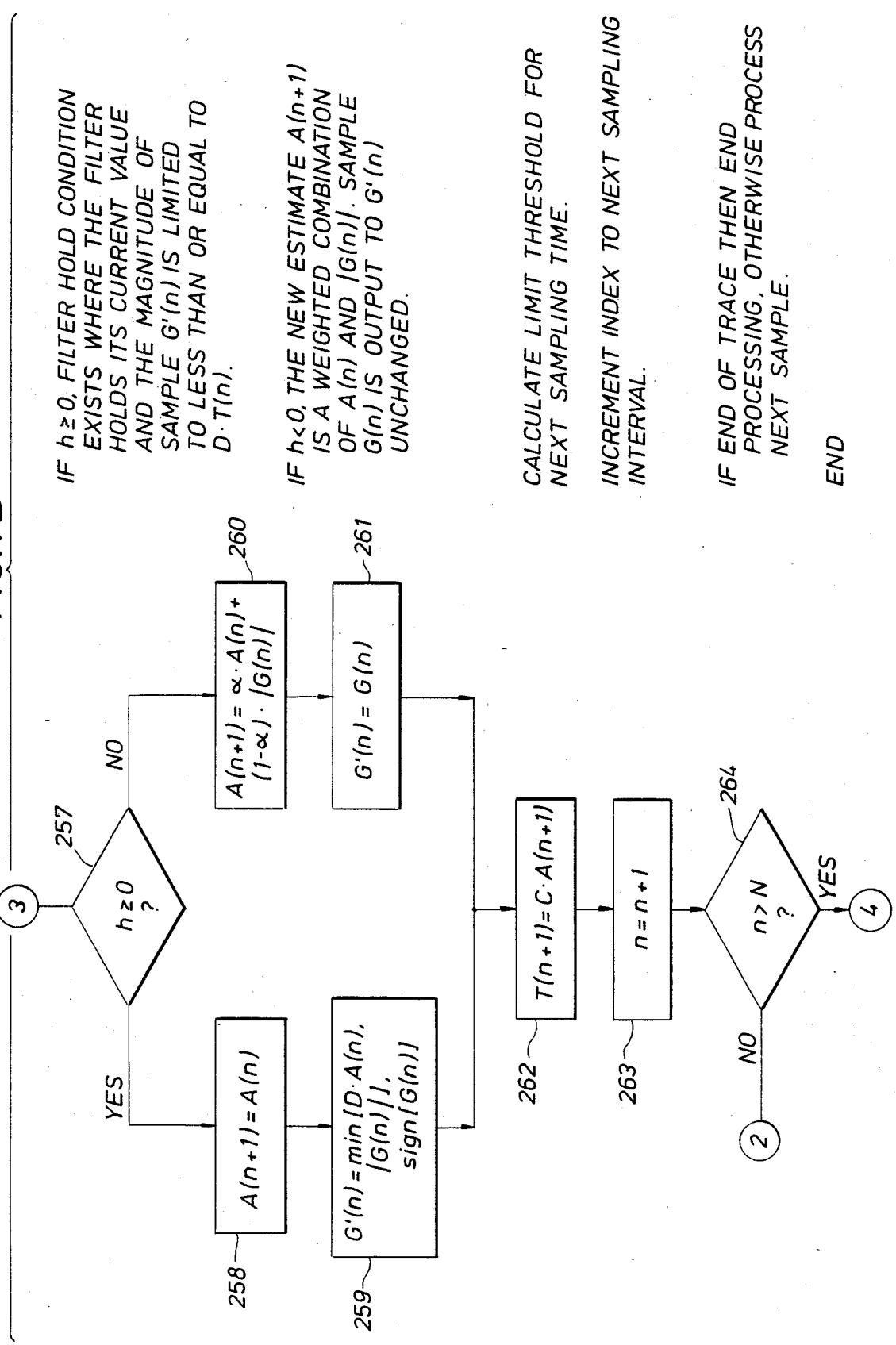

METHOD OF WEIGHTING A TRACE STACK FROM A PLURALITY OF INPUT TRACES

This is a division of application Ser. No. 07/240,956, filed Sept. 6, 1988 now U.S. Pat. No. 4,882,713.

BACKGROUND OF THE INVENTION

1. Field of the Invention

This invention pertains to the data processing of seismic traces to suppress noise and more specifically to such processing of stacked data through the development and employment of improved weighting factors.

2. Description of the Prior Art

This invention is relevant to acquisition of seismic data in the field of geophysical exploration for petroleum and minerals. Although it is not restricted to exploration in either land or marine environments, this method is presented with primary emphasis on land seismic applications since this is the area in which it has the most direct and widespread application.

The general seismic prospecting method involves transmission of acoustic waves through the earth and reception of these waves at the earth's surface via transducers called geophones. Typically, these geophones are wired in parallel collections called groups in order to increase electrical signal levels and attenuate surface traveling noises. The acoustic waves may be generated by various types of sources, dynamite and hydraulic vibrators being the most common. As these waves propagate downward through the earth, portions of their energy are sent back toward the earth's surface through the effects of reflections and refractions which occur whenever abrupt changes in acoustic impedance are encountered. Since these impedance changes coincide with sedimentary layer boundaries it is possible to image the layers by appropriate processing of the signals returned to geophone groups.

The quality of the images obtained from seismic data processing is limited by three principal factors. First, the factor of spherical divergence causes the signal amplitude to decay in a manner which is inversely proportional to the distance traveled. Second, the effects of absorption due to the inelasticity of the media of propagation further reduces the available signal level. Finally, the effects of source generated and environmentally generated noise tend to mask whatever signal remains after divergence and absorption effects. In fact, it is the effect of noise which limits the depth to which the seismic method can penetrate. To some extent this limitation can be overcome by increasing the source signal strength so that the received signal level is raised relative to the noise. However, since there are practical limitations on the size of the source, a preferable approach is to suppress the noise level as much as possible.

The amount of achievable noise reduction and the techniques used to suppress noise differ according to the type of noise being attacked. Since source generated noise is not random and is repeatable over various trials it is difficult if not impossible to suppress it until the data is processed. On the other hand, noise which is not source generated is generally random and, even if it is not, it is almost certainly asynchronous with the data gathering sequence. These factors allow environmentally generated noise to be suppressed by techniques performed as the data is being acquired.

There are three techniques which are effective at reducing environmentally generated noise. First, it is possible in some cases to detect and edit noise bursts out of the acquired data. This technique is therefore referred to as noise or trace editing. Second, it is possible to cancel random noises by summing like traces acquired during successive repetitions of the data acquisition sequence. This process is referred to as vertical stacking. Finally, the process of correlation provides an improvement in signal-to-noise ratio in cases where vibratory sources are used.

Seismic sources fall within one of two classifications, impulsive and non-impulsive. Impulsive sources are those which produce energy distributions which are highly time-limited but whose energy concentration is high. Typically, the signals produced by these are considered minimum phase or near-minimum phase time series, indicating that the rate of energy generation is as fast as possible for a given spectral energy distribution. As the bandwidth of such sources increases their corresponding output signals, or signatures, collapse in time. In the limit of infinite bandwidth, such signatures would reduce to what is referred to in signal processing literature as a delta function, a pulse of infinitesimal width and possessing infinite amplitude. Such pulses typically require little or no processing to reduce the pulse duration to acceptable limits. Conversely, non-impulsive sources are characterized by waveforms which are distributed in time which can have spectral energy densities which are comparable to impulsive sources but whose signatures persist in time and with lower amplitude. The signals produced by such sources are termed mixed-phase since the rate of energy generation is not as fast as their corresponding spectra will allow. One common conception of signals from non-impulsive sources is to consider them as concatenated collections of minute impulses of varying magnitude and sign.

Data collected from the use of non-impulsive sources such as vibrators always requires processing aimed at reducing the effective time duration of the signature. In such cases, a process known as correlation or matched filtering is applied to the data to collapse the pulse primarily by rotating the phase spectrum of the associated signature. While this process requires additional steps in processing, it does provide a certain amount of noise rejection. It also allows certain trace editing procedures to be performed prior to correlation which serve to suppress noise energy without seriously impacting the signal content of the processed output. This is intuitively evident by observing first of all that since a non-impulsive signal is broadly distributed in time, it is possible to remove small segments of it without detracting significantly from the total signal energy. Second, it can be observed that correlation applies the same phase adjustments to noise energy such that localized noise bursts which were once confined to a small time segment are spread over a broad segment of the data after correlation. This later principle has the effect of increasing the signal-to-noise ratio of the correlated data provided that the noise bursts are not large and are randomly distributed throughout the traces.

In considering the effect of noise upon the output of the correlation procedure, it is first necessary to define two classifications of noise. The first type of noise to be considered is that which persists in time with the same statistical characteristics, such as noise associated with certain types of stationary mechanical and electrical equipment as well as ground unrest due to other noise generators that are asynchronous in nature and are far removed so that no single noise source is dominant. In statistical terms, such noise sources are characterized by probability density functions which are constant or "stationary" with time and as such they are termed stationary noise sources. Conversely, the second classification of noise sources involves those that are sporadic in nature, such as lightning and activity of the crew along a seismic line. Such noise sources are characterized by probability density functions that are time-variant and are termed "non-stationary" noise sources.

Differentiation between stationary and non-stationary noise sources can be ambiguous since the probability density functions obtained vary considerably with the size of the time gate over which the noise source is analyzed. For example, a noise source which produces pulses at half-second intervals would have a constant probability density function and would appear to be stationary if the analysis time gate were sufficiently long. Conversely, if the time gate is small the estimate of the probability density function tends to vary according to the number of noise pulses each contains and in such cases the noise would appear to be non-stationary. In the seismic case, the issue of stationarity is generally resolved by using time gates which are comparable to the period of the lowest frequency included in the signal.

The relative effects of stationary and non-stationary noises on correlated data quality can be seen by considering the nature of these noises and their effect on the correlation process. The phase shifts that occur during the correlation process have no effect on stationary noises since by definition stationary noises are already distributed throughout each input trace. Non-stationary noise sources on the other hand, can and typically do produce noise energy that arrives in bursts. The phase shifts associated with correlation then effectively smear the energy contained in the bursts into surrounding time segments. This will have effects that vary from being unnoticeable to that of corrupting the correlated trace and possibly the output trace into which it is summed.

The effect of correlation on data that contains noise bursts can be handled more analytically by recognizing that correlation is quite similar to convolution, the only difference being that in correlation one of the operand traces is effectively time reversed. By analogy, a noise burst embedded in an input trace is similar to a filter impulse response which is convolved with an input time series. The net effect on the output is to overlay a filtered and time reversed version of the correlation reference trace on top of the correlated trace. By this observation it is apparent that not only the amplitude of the noise burst but also its shape have a bearing on the manner in which the noise is transmitted into the correlated trace.

Considerations concerning the shape of noise bursts point up some potential pitfalls of noise limiting techniques since they can have a significant effect on the shape of noise bursts. Consider, for example, the pulse which results when an impulse is applied to a inelastic medium. This is very appropriate since the surface of the earth is generally very inelastic. The initial compressional lobe of the pulse peaks at a large amplitude are followed by a relaxational lobe that has substantially the same area but a lower peak amplitude and longer duration. The approach taken by some traditional limiter techniques would be to detect and clip the initial lobe but leave the second lobe intact since it is of lower amplitude. This approach has the intended effect of reducing the peak-to-peak amplitude of the pulse, however it also modifies the spectrum of the noise burst by introducing an additional low frequency content that could still correlate well with portions of the reference signal. In such cases, the net effect of clipping may be trade off the frequencies at which the noise burst correlates with the reference. In light of this, the ideal solution to the limiter problem would be to somehow detect and scale the entire noise burst down in amplitude to some optimal value.

One problem associated with the elimination of noise bursts is first, that it is difficult to determine relative amounts of signal and noise, and second, that it is difficult to discriminate against noise without also affecting signal. In the example given above, the only reason that the noise burst was recognized as such was that it has an anomolously high amplitude. On a trace by trace basis without any information other than the expected level and approximate bandwidth of the signal, the only criteria for noise burst detection is the presence of obvious amplitude anomalies. One advantage of using non-impulsive sources is that due to their mixed-phase quality their signal strength is relatively low and sharp changes in signal strength are rare. It is, therefore, easier to detect noise bursts due to their contrasting qualities of high levels and sharp onset.

Assuming that a noise burst is first detected, the problem then arises concerning the effective elimination of the noise while minimizing any effects on signal. Furthermore, as stated above, the problem of eliminating the noise burst without causing problems in the correlation results also exists. In addition to the basic technique of clipping noise bursts, several more elaborate schemes have been developed. A typical example of this is known as the recursive edit in which a time segment of the trace is zeroed starting at the last zero crossing before the noise burst and lasting for a specified amount of time after the burst. By zeroing all data between zero crossings this method attempts to minimize generation of high frequencies as well as the edge effects on correlation. Clearly, however, this does not recover the signal which was in the time segment along with the noise burst.

A method first employed by Embree and discussed in his U.S. Pat. No. 3,398,396, neatly addresses problems of noise detection and suppression in one straightforward procedure. This procedure is called the Diversity Stack and has found wide application in suppressing non-stationary noise while preserving signal.

The power of the Diversity Stack procedure comes from exploitation of the fact that signal is invariant between input traces originating from the same geodetic receiver location and relationship to the source location. Assuming that signal is uncorrelated with noise the total energy within a trace time segment is given by:

$$P_i = \int_{t1}^{t2} S(t)^2 \, dt + \int_{t1}^{t2} N_i(t)^2 \, dt$$

(where t1, t2=begin and end times of time segment.)

If it is assumed that S(t) is invariant between like trace time segments, any relative increase in Pi must be due to an increased noise level for that trace segment. Using this fact, the Diversity Power Stack prorates corresponding segments of input traces according to the inverse of the energy within that segment before stacking each trace. A weight stack is also maintained as a record of the total weight applied to each trace sample so that the aggregate weighting can be removed when the stack is complete. This last step is referred to as stack normalization.

The following is a formal detailed analysis of optimal stacking in the presence of time-varying noise components which are characterized by sporadic increases in noise amplitudes:

Given a set of trace time series which originate from a single surface location as the result of multiple seismic excitations at a substantially constant surface location, each trace within the set may be described by $G_i(t) = S_i(t) + N_i(t)$ where $S_i(t)$ is the signal component containing useful seismic information and $N_i(t)$ is the noise component consisting of sporadic time-variant noises and ambient time-invariant noise. The subscript $i$ is used to indicate the trace within the set which arises from the $i$'th seismic excitation at the source location. A generalized weighted trace stack is then given by $$G(t) = \sum_{i=1}^{M} W_i G_i(t) / \sum_{i=1}^{M} W_i$$

$$= \sum_{i=1}^{M} W_i(S_i(t) + N_i(t)) / \sum_{i=1}^{M} W_i$$

By definition the signal $S_i(t)$ is independent of $i$ so that the above may be rewritten as $$G(t) = S(t) + \sum_{i=1}^{M} W_i N_i(t) / \sum_{i=1}^{M} W_i$$

The total energy in G(t) is $$G = \int_0^T \left( S(t)^2 + \sum_{i=1}^{M} W_i^2 N_i(t)^2 / \left( \sum_{i=1}^{M} W_i \right)^2 \right) dt$$

$$= S + \sum_{i=1}^{M} W_i^2 \int_0^T N_i(t)^2 dt / \left( \sum_{i=1}^{M} W_i \right)^2$$

$$= S + \sum_{i=1}^{M} W_i^2 N_i / \left( \sum_{i=1}^{M} W_i \right)^2$$

Here the first term is the total signal energy and the second term represents the total noise energy in G(t) after weighting, stacking and normalization.

The optimal value for an arbitrary weight $W_k$ is obtained by minimizing the noise energy term with respect to $W_k$. Differentiating with respect to $W_k$ $$\frac{d}{dW_k} \left( \sum_{i=1}^{M} W_i^2 N_i / \left( \sum_{i=1}^{M} W_i \right)^2 \right) =$$

$$\frac{2W_k N_k \left( W_k + \sum_{\substack{i=1 \\ i \neq k}}^{M} W_i \right)^2 - 2\left( W_k + \sum_{\substack{i=1 \\ i \neq k}}^{M} W_i \right)\left( W_k^2 N_k + \sum_{\substack{i=1 \\ i \neq k}}^{M} W_i^2 N_i \right)}{\left( W_k + \sum_{\substack{i=1 \\ i \neq k}}^{M} W_i \right)^4} =$$

-continued $$2\left( W_k N_k \left( \sum_{\substack{i=1 \\ i \neq k}}^{M} W_i \right) - \sum_{\substack{i=1 \\ i \neq k}}^{M} W_i^2 N_i \right) / \left( \sum_{i=1}^{M} W_i \right)^3$$

Setting the numerator to zero and simplifying the following relationship is obtained:

$$W_k N_k = \sum_{\substack{i=1 \\ i \neq k}}^{M} W_i^2 N_i / \sum_{\substack{i=1 \\ i \neq k}}^{M} W_i$$

Upon inspection, it is apparent that the relationship $W_i = C/N_i$ for $i = 1, M$ provides a general solution where C is an arbitrary constant.

Although $W_i$ is not time varying, the above derivation may be extended to show that $W_i(t) = 1/N_i(t)$ is an optimal time varying weight function where $N_i(t)$ is the noise energy in a time gate containing t. The only restriction is that this time gate be large enough to obtain an accurate estimate of $N_i(t)$.

Substituting $W_i = W_i(t)$, $S = S(t)$ and $N_i = N_i(t)$ into the above equations $$W_i(t) = 1/N_i(t) \text{ for optimal } W_i(t)$$

$$\frac{dN(t)}{dW_k(t)} =$$

$$2\left( N_k(t) W_k(t) \sum_{i=1}^{M} W_i(t) - \sum_{\substack{i=1 \\ i \neq k}}^{M} W_i^2(t) N_i(t) \right) / \left( \sum_{i=1}^{M} W_i(t) \right)^3$$

Assuming optimal weighting N(t) becomes $$N(t) = \left( \sum_{i=1}^{M} W_i(t)^2 N_i(t) / \left( \sum_{i=1}^{M} W_i(t) \right)^2 \right)$$

$$= \left( \sum_{i=1}^{M} W_i(t) \right) / \left( \sum_{i=1}^{M} W_i(t) \right)^2$$

$$= 1/\sum_{i=1}^{M} W_i(t)$$

The signal to noise power ratio is then $$\theta(t) = S(t)/N(t)$$

$$= S(t) \sum_{i=1}^{M} W_i(t)$$

$$= S(t) \sum_{i=1}^{M} 1/N_i(t) = \sum_{i=1}^{M} S(t)/N_i(t)$$

$$= \sum_{i=1}^{M} \theta_i(t)$$

where $\theta_i(t)$ is the signal to noise power ratio of the component traces. The signal to noise amplitude ratio is $$\phi(t) = S(t)^{\frac{1}{2}} / \left( \sum_{i=1}^{M} N_i(t) \right)^{\frac{1}{2}}$$

$$= S(t)^{\frac{1}{2}} / \left( \sum_{i=1}^{M} 1/W_i(t) \right)^{\frac{1}{2}}$$

From these relationships for $\theta(t)$ and $\phi(t)$, it is evident that the signal to noise power ratio of the optimally weighted stack is equal to the sum of the signal to noise power ratios of the component traces. Furthermore when $N_i(t)$, $i=1$, M are all stationary random time series with equal variance the signal to noise amplitude ratio reduces to $$\phi(t) = M^{\frac{1}{2}} S(t)^{\frac{1}{2}} / N(t)^{\frac{1}{2}}$$

Thus, the improvement in signal to noise ratio of the weighted stack is equivalent to that obtainable by unweighted stacking. In fact since $W_i(t) = 1/N_i(t) = 1/N$, the weighted stack becomes an unweighted stack in the absence of non-stationary noise components.

Since the actual relationship of signal and noise energies is not generally known, the approximation for $W_i(t)$ must be based upon $(S(t)+N_i(t))$ instead of $N_i(t)$ alone. The first and most obvious approximation takes the form $W_i'(t)=C'/(\delta(t)+N_i(t))$, but in this case $W_i'(t)$ underestimates $W_i(t)$ except when $S(t)<<N_i(t)$.

In order to overcome this underestimation and optimize $W_i(t)$ for estimated signal to background noise ratios an additional parameter $B_i(t)$ is added so that the approximation becomes $$W'(t) = C'/(\phi(t) + N_i(t))^{B_i(t)/2}$$

where $B_i(t) \geq 2$

Since only relative weighting is of concern, the objective in evaluating $B_i(t)$ is not to force $W_i'(t) = W_i(t)$ but rather $dW_i'(t)/dN_i(t) = dW_i(t)/dN_i(t)$, or alternatively $$d \, Ln(W_i'(t))/dN_i(t) = d \, Ln(W_i(t))/dN_i(t)$$

Differentiating and solving for $B_i(t)$ gives $$d \, Ln(W_i'(t))/dN_i(t) = -B_i(t)/2(N_i(t) + S(t))$$

$$d \, Ln(W_i(t))/dN_i(t) = -1/N_i(t)$$

$$1/N_i(t) = B_i(t)/2(N_i(t) + S(t))$$

$$B_i(t) = 2(1 + (S(t)/N_i(t)))$$

This relationship allows $B_i(t)$ to be calculated based upon estimated or anticipated signal to noise ratios. Theoretically, there should be no upper bound on $B_i(t)$. From a practical standpoint, however, it can be argued that when $S(t)/N_i(t) >> 1$, the signal to noise ratio of the component traces $G_i(t)$ is already so large that any further increase in $B_i(t)$ and consequently the weight function $W_i(t)$ would have only marginal value. It may also be observed that when $S(t) << N(t)$, $B(t)$ reduces to the value 2.0 as embodied in the Diversity Power Stack, consistent with the fact that it also assumes $S(t) << N(t)$.

As mentioned previously the signal to noise power ratio $S(t)/N_i(t)$ is not generally known unless some type of coherence analysis is performed prior to stacking, but to do this on a large scale would certainly be cost prohibitive. Since the purpose of $B_i(t)$ is to equivalence noise dependent variations in the optimal weight $W_i(t)$ and the approximate optimal weight $W_i'(t)$, some efficient criteria for estimating $B_i(t)$ is needed in lieu of coherence analysis procedures. Here, a fairly accurate estimate can be made of expected noise power using time gates at the start and end of one or more component traces and assuming that the power observed in these gates is solely due to noise with both stationary and non-stationary components which are assumed to be uncorrelated. This estimate is given by $$Ne = \text{median } (N_{ij}), \, i=1,M; \, j=1,N$$

where $N_{ij}$ is the noise estimate associated with the j'th noise estimation gate of the i'th input trace.

The justification in using the median as opposed to another estimator such as the average is that it is not overly influenced by large noise burst which happen to fall within an estimation gate. This tends to give an estimate for Ne that is nested within the noise estimates of the majority of the time gates.

Using this estimate the following approximations are made for $S(t)$ and $B_i(t)$:

$$B_i(t) = 2(1 + ((S(t) + N_i(t)) - N_e)/N_e) \geq 2.0$$

$$= 2(1 + (G_i(t) - N_e)/N_e) \geq 2.0$$

This last expression allows the function $B_i(t)$ to be computed on a per trace basis using quantities that are directly obtainable from the data, the total trace energy $G_i(t)$ and the background noise estimate $N_e$.

The lower bound on $B_i(t)$ is set due to knowledge that optimal $B_i(t)$ never goes below 2 and values of $B_i(t)$ which violate this constraint must be due to overestimation of Ne. By setting the lower limit of $B_i(t)$ at 2, the risks associated with overestimation of the noise power are minimized by restricting $B_i(t)$ from assuming values which are known to be sub-optimal in any case.

Since Embree's development of the Diversity Power Stack, Robinson, "Statistically Optimal Stacking of Seismic Data", Geophysics, Jun. 1970, and Smith et al., U.S. Pat. No. 4,561,075, have also addressed the theory of optimal stacking, both of these treatments further refined the development of the weight function. Methods proposed and evaluated by Robinson were directed toward optimizing weight functions with a minimal number of assumptions about the relative levels of signal and noise energies within the constituent traces. For this reason, the methods of weighting that Robinson developed were very robust but required a large amount of computation and memory storage capacity which made them impractical for real time field applications. Smith et al. on the other hand set forth a recording system which used the basic prior art Diversity Stacking method but went further in allowing selection of integer exponents other than 2 to compensate for signal to noise ratios that are comparable to or in excess of 1. The selection of the exponent was then based upon the expected relationship of signal and noise typical among all traces. Exponents which are greater than two result in a more dramatic suppression of trace amplitude for a given increase in noise energy than do exponents of lower orders. This provides a more optimal weighting of traces during periods of high signal to noise ratio with the consequence that later portions of the traces where the signal component has decayed are overly suppressed in the presence of sporadic noise bursts.

Traditional methods of computing the Diversity Stack typically use time domain linear interpolation between time segments to approximate the weight function, W(t), which causes two fundamental problems. First, the derivatives of W(t) are discontinuous, thus producing high frequencies in the spectrum of W(t). Since multiplication in the time domain is equivalent to convolution in the frequency domain, these higher frequency components will cause spectral smearing in the weighted trace. The second problem is that these methods produce inaccurate estimates of W(t), since the time relationship between the noise bursts and time segments is not controllable.

Therefore, it is a feature of the present invention to provide the development of an improved optimized seismic stack trace utilizing a weighted trace stack and a weight stack wherein the individual weight functions are determined on a one-to-one correspondence with the individual seismic traces following the removal of gross amplitude anomalies, the resulting weighted trace stack then being divided by the resulting weight stack.

It is another feature of the present invention to provide an improved procedure for developing the weights for individual traces whereby the development employs conversions of individual sampled digital data from the time domain to the frequency domain and back again to minimize the mathematical manipulations required for application of filters and the time decimation and converse resampling of time domain counterparts.

SUMMARY OF THE INVENTION

It is assumed that the individual recorded traces for a stack each includes noise as well as signal and that the noise includes time-variant and time-invariant portions. Furthermore, it is assumed that the signal components of all traces that are weighted and summed together are substantially identical. Generally, the method involves removing the gross amplitude anomalies from each individual trace, establishing a plurality of weight functions for each respective seismic trace, summing the weight functions to produce a weight stack, applying the individual weight functions to each of the traces and summing the result to produce a weighted trace stack, and finally, dividing the weighted trace stack by the weight stack to produce an optimized stack trace in which the signal component is enhanced and the noise component is suppressed.

The procedure for computing each particular weight function involves squaring each sample of a trace time series to obtain an instantaneous power time series, transforming the power time series to produce a frequency spectrum, low pass filtering this spectrum and truncating the resultant spectrum so as to effect time decimation of the corresponding time domain function, transforming the truncated spectrum to the time domain producing an energy envelope function which is decimated in time relative to the input trace, calculating a corresponding weight function by exponentiating each sample of the energy envelope function by a negative factor, transforming the weight function to the frequency domain, low pass filtering and expanding the resultant spectrum to reverse the effects of the previous time decimation, and transforming this expanded spectrum back to the time domain to produce a weight function having a common sampling interval with the input trace.

BRIEF DESCRIPTION OF DRAWINGS

So that the manner in which the above-recited features, advantages and objects of the invention, as well as others which will become apparent, are attained and can be understood in detail, more particular description of the invention briefly summarized above may be had reference to the embodiments thereof that are illustrated in the drawings, which drawings form a part of the specification. It is to be noted, however, that the appended drawings illustrate only preferred embodiments of the invention and are, therefore, not to be considered limiting of its scope for the invention may admit to other equally effective embodiments.

In the drawings:

FIGS. 7A-7B is a process flow graph of the adaptive threshold limiter procedure.

DESCRIPTION OF THE PREFERRED EMBODIMENTS

Figure 1:
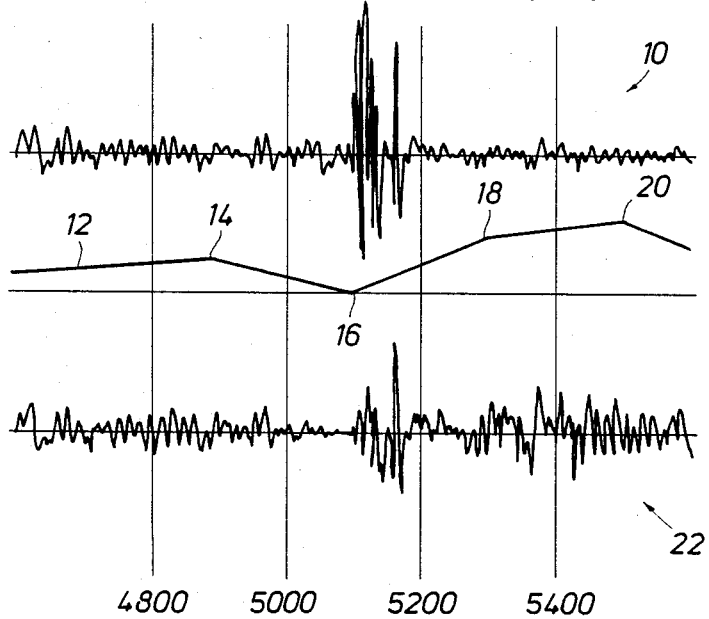
FIG. 1 is a waveform diagram of a typical weighted trace processed in accordance with the prior art method of performing the Diversity Power Stack.
Figure 2:
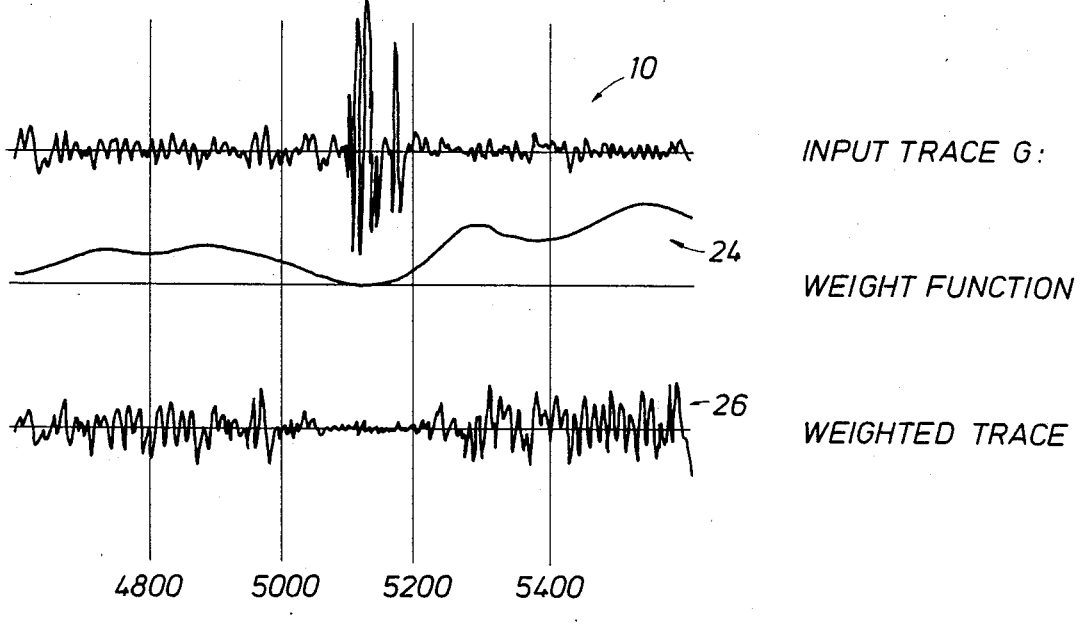
FIG. 2 is a waveform diagram of the same input trace as in FIG. 1 weighted in accordance with the present invention so as to correspond with the waveform diagram shown in FIG. 1.

Now referring to the drawings, and first to FIGS. 1 and 2, a comparison of the Diversity Power Stack as practiced in the prior art and the Diversity Power Stack as implemented in the present invention, is illustrated. The weighting of a Diversity Power Stack is probably the closest procedure in the prior art to weighting in accordance with the present invention. In the procedure illustrated, the portion or plot gate of the selected input trace $G_i(10)$ is shown in the time period between 4600 and 5598 milliseconds. The trace is assumed to include both a signal and a noise component. The trace is divided into time periods at 4800, 5000, 5200, and 5400 milliseconds. The weight function is determined for the inverse of the average amount of energy represented for each time period and a point is plotted at the mid-point for each time period, namely, at mid-points 12, 14, 16, 18 and 20. The points are then sequentially joined together by linear interpolation. It should be noted that the weight function is substantially zero at mid-point 16 in the time window having the largest average energy level, which also appears to include a great deal of spurious noise. For example purposes, it may also be seen that the weight function in the first time period is substantially the value of "one". When the weight function is multiplied times the input trace, a weighted trace 22 is produced.

It is especially evident that the straight line interpolation between points 12, 14, 16, 18 and 20 has produced a weighted trace that is corrected for weighting values that are not accurately determined for each sampled point. Furthermore, the noise in the center time window of the weighted trace is still large and, therefore, if assumed to be signal is obviously giving false information to the investigator.

By contrast, the same input trace 10 is shown divided into the same time windows as shown in FIG. 1. A time window determines the filter width at 200 milliseconds. A smoothly changing weight function 24 is developed in accordance with the procedures hereafter described, which, in turn, determines the development of weighted trace 26, also in accordance with the procedures hereafter discussed. The exponential bias is selected to be 2.0, commensurate with the Diversity Power Stack.

For the FIG. 2 weighted trace, the meaningful signal appears to be approximately the same from time window to time window and, where it is known that a large amount of noise exists, namely, in the middle window, that covers up or obscures whatever meaningful signal might be present, the amplitude in the resulting weighted trace is purposely reduced because it is of very little value.

The development of the weighted trace and the development of a normalized trace from a weighted trace stack can best be set forth in a mathematical development. The following is a list of all operator, variable and vector names used in process flow charts of FIGS. 3 and 4. By convention all variables and vectors used in the context of the time domain are specified in printed form (i.e., A, B, C, etc.). All variables and vectors used in the context of the frequency domain are specified in script form (i.e., A, B, C, etc.). Indices pertaining to both time and frequency domains are always in lower case printed form.

| | DEFINITION |
|---|---|
| OPERATOR | |
| FFT | Forward Fast Fourier Transform producing L/2 complex frequency samples from L real time samples. |
| FFT$^{-1}$ | Inverse Fast Fourier Transform producing L real time samples from L/2 complex frequency samples. |
| ATL | Adaptive Threshold Limiter process used to clip large spikes which would be deleterious to the weighting process. |
| VARIABLE, CONSTANT OR VECTOR | |
| i | Index variable used to denote input trace being processed by i'th iteration of weighting process. |
| $i$ | Defined as $\sqrt{-1}$. |
| j | Running index used to specify elements within time and frequency domain vectors. |
| k | Index limit used in specifying the limits of values which j assumes. |
| $N_t$ | Total number of traces processed by the weighting process. |
| $G_i$ | Time domain vector containing the input trace being processed by the i'th iteration of the weighting process. |
| $G_w$ | The weighted trace stack which is accumulated during the $N_T$ iterations of the weighting process. This stack contains the final normalized stack output after the normalization process. |
| $N_g$ | Number of samples in $G_i$ and $G_w$. |
| N | Number defined as first power of 2 greater than $N_g$. |
| n | Defined as N/2 giving the number of complex elements in the output of FFT. |
| F | Real vector containing the time domain representation of low pass filter used to estimate energy envelope of $G_i$. Both positive and negative time lags of the filter are specified. A zero phase filter is assumed in this particular embodiment. It is anticipated that other filters could be used. |
| B | Exponential bias parameter. |
| $N_f$ | Number of samples defining non-zero duration of filter F in both positive and negative time. |
| $\mathcal{F}$ | $M_f$ point complex frequency spectrum corresponding to filter impulse response F. |
| $M_f$ | Number of complex points required to accurately estimate the actual filter F. and its time domain counterpart F. |
| M | Size of FFT required for frequency domain application of filter F to N point time series. |
| $\frac{M}{E}$ | Number defined as M/2. N complex point vector used to develop time-decimated energy envelope E. |
| P | N point real vector defined as $G_i^2$ giving the instantaneous power of $G_i$ as a function of time. |
| $E_d$ | Time-decimated energy envelope estimate. |
| D | Time decimation factor given by D = N/M. |
| $W_d$ | Time-decimated weight function vector consisting of M real points. |
| $\mathcal{W}$ | M complex point vector used to develop weight function W. |
| W | Weight function used to weight $G_i$ during the i'th iteration of the weighting process. |
| $\mathcal{V}$ | The weight function stack after frequency domain |

| | DEFINITION |
|---|---|
| $V$ | interpolation back to original time sampling rate. The $N$ complex point frequency spectrum of the final weight stack V. Only the first $M_F$ points of this spectrum are non-zero and only these require storage. |

Figure 3A:
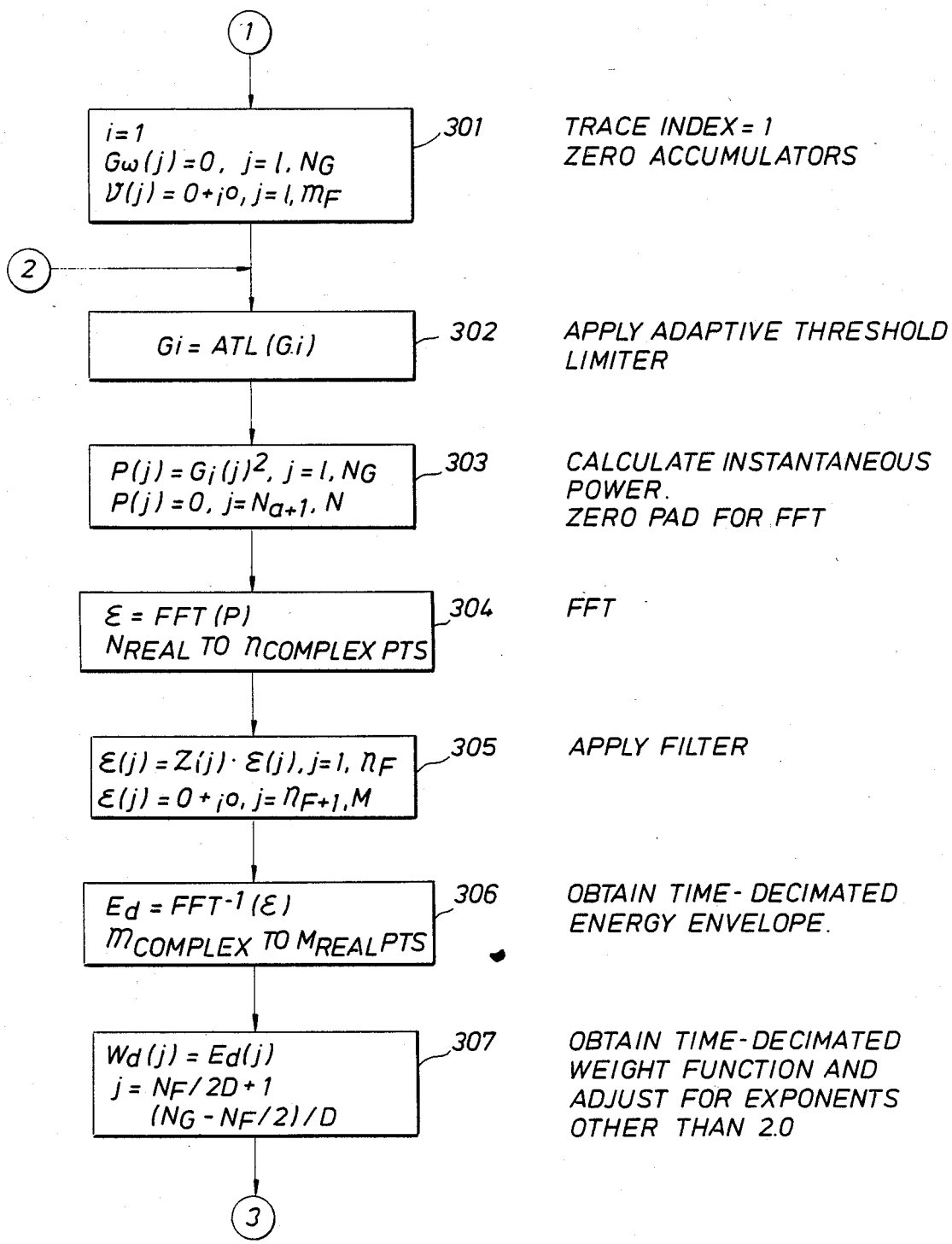
FIGS. 3A-3C is a process flow graph of the noise suppressed weighting process of a preferred sequence in accordance with the present invention.
Figure 3B:
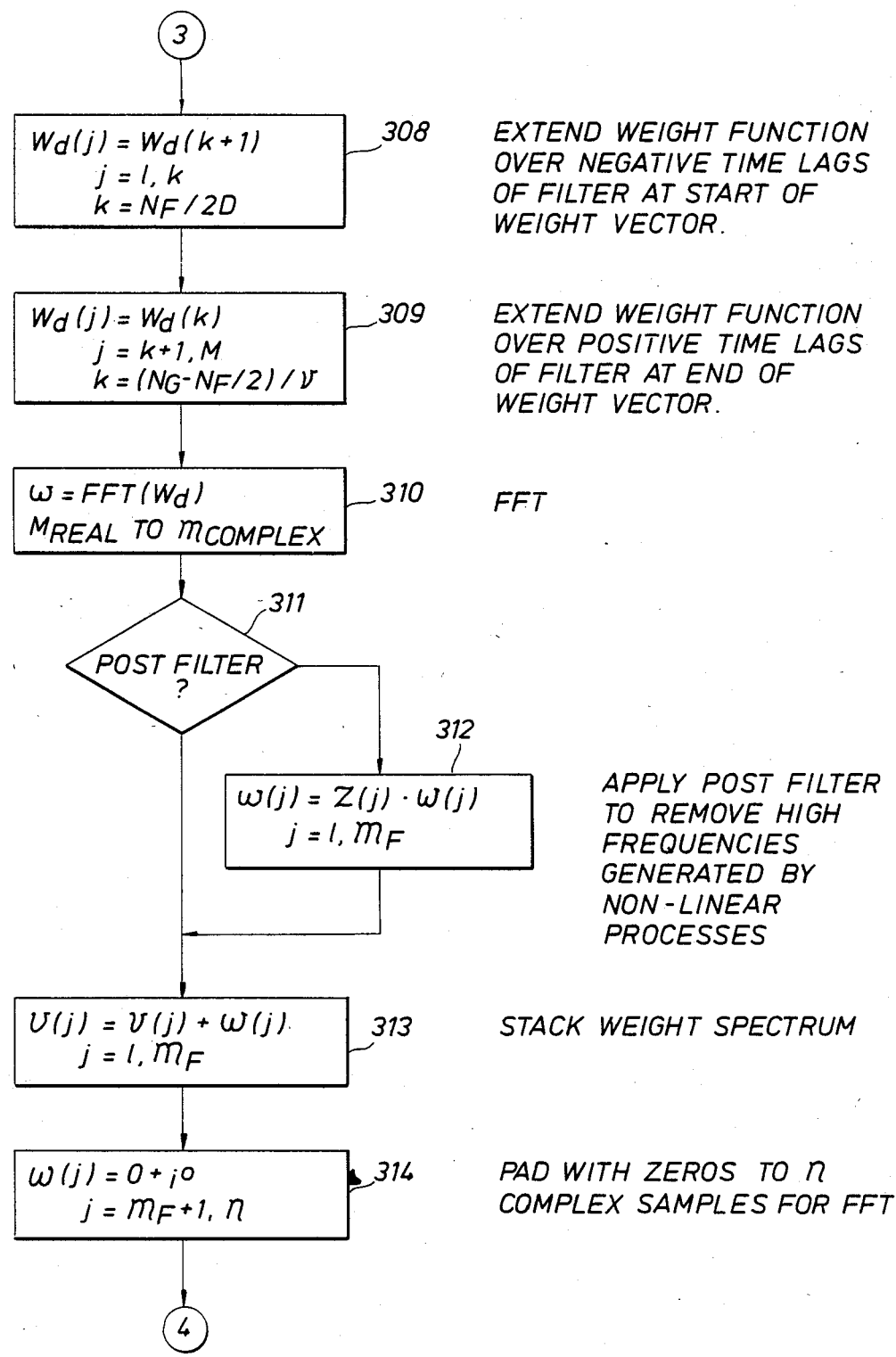
Figure 3C:
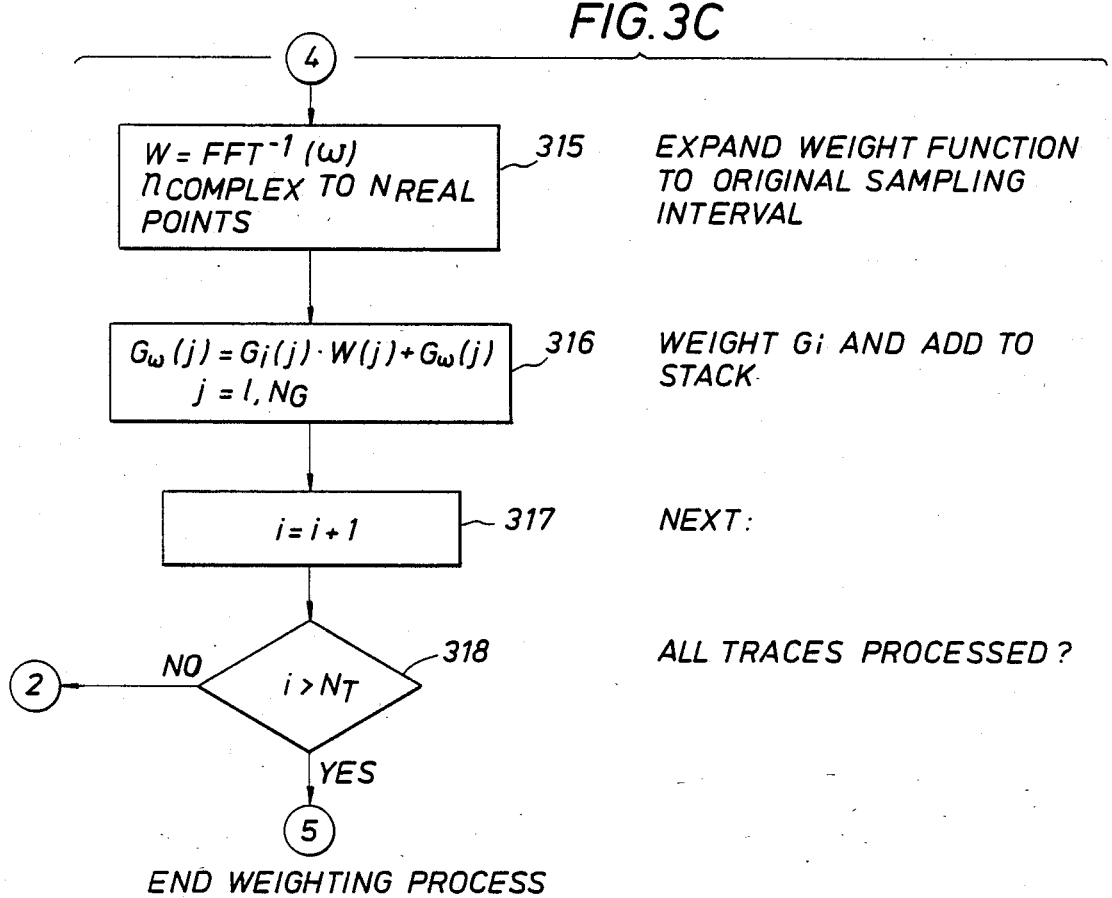
Figure 4:
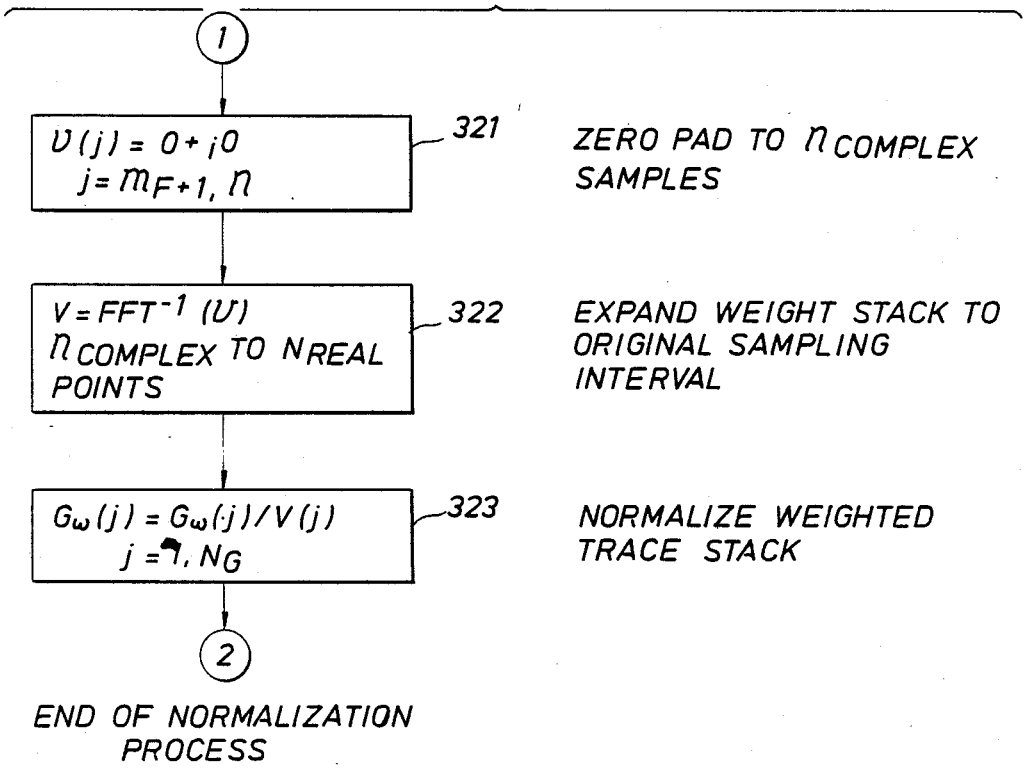
FIG. 4 is a process flow graph of the noise suppressed stack normalization process of a preferred sequence in accordance with the present invention.

The preferred procedure for developing a noise suppressed, weighted stack in accordance with the present invention involves the following steps as shown in FIG. 3 for computing and applying weight functions to each of a plurality of related input traces, adding the resultant weighted traces to a weighted trace stack and adding the weight function spectra to form a weight stack spectrum:

Step 301—Accumulator buffers for the weight stack and weighted trace stack are zeroed. Index i is set equal to one indicating the first trace to be processed.

Step 302—The adaptive threshold limiter procedure is applied to trace $G_i$ to clip large amplitude anomalies prior to weighting. This procedure eliminates large spikes which would otherwise have a deleterious effect on weight function calculations.

Step 303—The $N_g$ samples of trace $G_i$ are squared on a sample-by-sample basis to obtain an instantaneous power time series. The series is further augmented to N samples as required for input to the FFT 304.

Step 304—The N sample time series P obtained in Step 303 is transformed to an N sample frequency spectrum E via forward Fast Fourier Transform in preparation for filtering and reduction of the resulting spectrum.

Step 305—Spectrum E is multiplied by low pass filter F for the first $M_f$ samples of the spectrum. This result is then augmented to M complex samples by padding with complex zeroes. Reducing the size of the spectrum to M complex points from its original size of N complex points results in spectral truncation which has the effect of sub-sampling or decimating the corresponding time series. The equivalent time domain effect of the filter application is a convolution of the filter's impulse response with the instantaneous power time series developed in step 302. Ideally, the impulse response of the filter is a center-weighted bell curve which has little or no side lobes and, hence, has no negative values of significant magnitude. Filter operators of this type have been referred to as finite time integrators since their net effect is to integrate time functions over limited time segments. Hence, application of this filter to the instantaneous power time series integrates the power values to form a time varying estimate of the energy which is local to each sample time.

Step 306—Truncated spectrum E is transformed to the time domain yielding a time-decimated energy envelope function $E_d$ having a sampling interval larger than the sampling interval of $G_i$ by a factor of $D=N/M$, where M is the size of the truncated spectrum and N is the size of the untruncated spectrum generated at step 304.

Step 307—The center portion of weight function $W_d$ is computed by exponentiating samples of $E_d$ by a factor of $-B/2$. This has two effects. First, a multiplicative inversion of each sample takes place due to the negative valued exponent. Second, the magnitude of the exponent is adjusted to account for the fact that the input time series was squared in step 303, thereby compensating for values of exponential bias B other than 2.0. If B is equal to 2.0, this step reduces to multiplicative inversion of each sample necessary to form the weight function from the energy estimate.

Step 308—Since step 305 implied the time domain convolution of a low pass filter with the time series P, the energy envelope is invalid due to edge effects for a number samples at locations corresponding to the first $N_f/2$ samples of trace $G_i$. Here the value of $W_d$ at the decimated sampling time $k=N_f/2D+1$ is propagated into sample locations 1 through k−1 to compensate for the edge effect at the start of the time series $W_d$.

Step 309—Also due to the edge effects of the convolution of step 305, the sample of $W_d$ at decimated time sample $k=(N_g-(N_f/2))/D$ is propagated into sample locations k+1 through M to compensate for the edge effect at the end of time series $W_d$.

Step 310—The decimated weight function time series consisting of the M samples constructed in steps 307–309 is transformed to the frequency domain in preparation for spectral augmentation and optional low pass filtering.

Step 311—This step indicates the option to post filter the weight function spectrum to eliminate higher frequencies caused by the non-linear exponentiation performed at step 307.

Step 312—Low pass filter F is applied by complex multiplication of its spectrum with the weight function spectrum for $M_f$ complex points.

Step 313—The weight function spectrum is added to the weight stack spectrum V. Since only $M_f$ points of filter F are non-zero, only $M_f$ points need to be added and only $M_f$ points of V require permanent storage.

Step 314—The weight function spectrum W is augmented with complex zeroes to obtain a N complex point spectrum. This has the effect of resampling the corresponding time function, reversing the time decimation effects of steps 305 and 306. That is, the sampling interval between successive samples in the corresponding time domain function is decreased by a factor $D=N/M$ corresponding to the original decimation.

Step 315—The inverse Fast Fourier Transform is applied to the N complex point weight function spectrum, producing a weight function whose sampling interval is equal to the sampling interval of the original trace $G_i$.

Step 316—Trace $G_i$ is multiplied by the first $N_g$ samples of weight function W on a sample-by-sample basis and the result is added to weighted trace stack $G_w$.

Step 317—Trace index i is incremented by one to the next trace to be processed.

Step 318—Trace index i is compared to $N_t$, the total number of traces within the stack. If more traces remain, the above sequence is repeated starting at step 302. If no traces remain, the process of weighting and stacking ends.

After steps 302 through 318 have been performed for each trace input to the stack, the weight spectrum stack reflects the composite weighting applied through the weighting of individual traces. The weighted trace stack reflects the composite effects of summing weighted traces, hence the amplitude of the signal is a distorted version of the actual signal. In order to restore the weighted trace stack to its true amplitude relationships, the stack must be normalized by backing out the composite weight function. This is accomplished in steps 321 through 323 of FIG. 4 as follows:

Step 321—The weight stack spectrum V, which was originally $M_f$ points long, is augmented to N complex points by padding with complex zeroes. This has the effect of resampling the corresponding time domain function, reversing the time decimation effects of steps 305 and 306. That is, the time interval between successive samples is reduced by a factor equal to $D=N/M$, corresponding to the original decimation.

Step 322—The inverse Fast Fourier Transform is applied to the weight stack spectrum V to obtain a weight stack V consisting of a time series whose sampling interval is the same as the sampling interval of traces $G_i$.

Step 323—The weighted trace stack $G_w$ is normalized by dividing it by the weight stack V. In doing so the signal component of $G_w$ is made identical to within a constant scale factor to the signal component common to all traces input to the stack.

Figure 5:
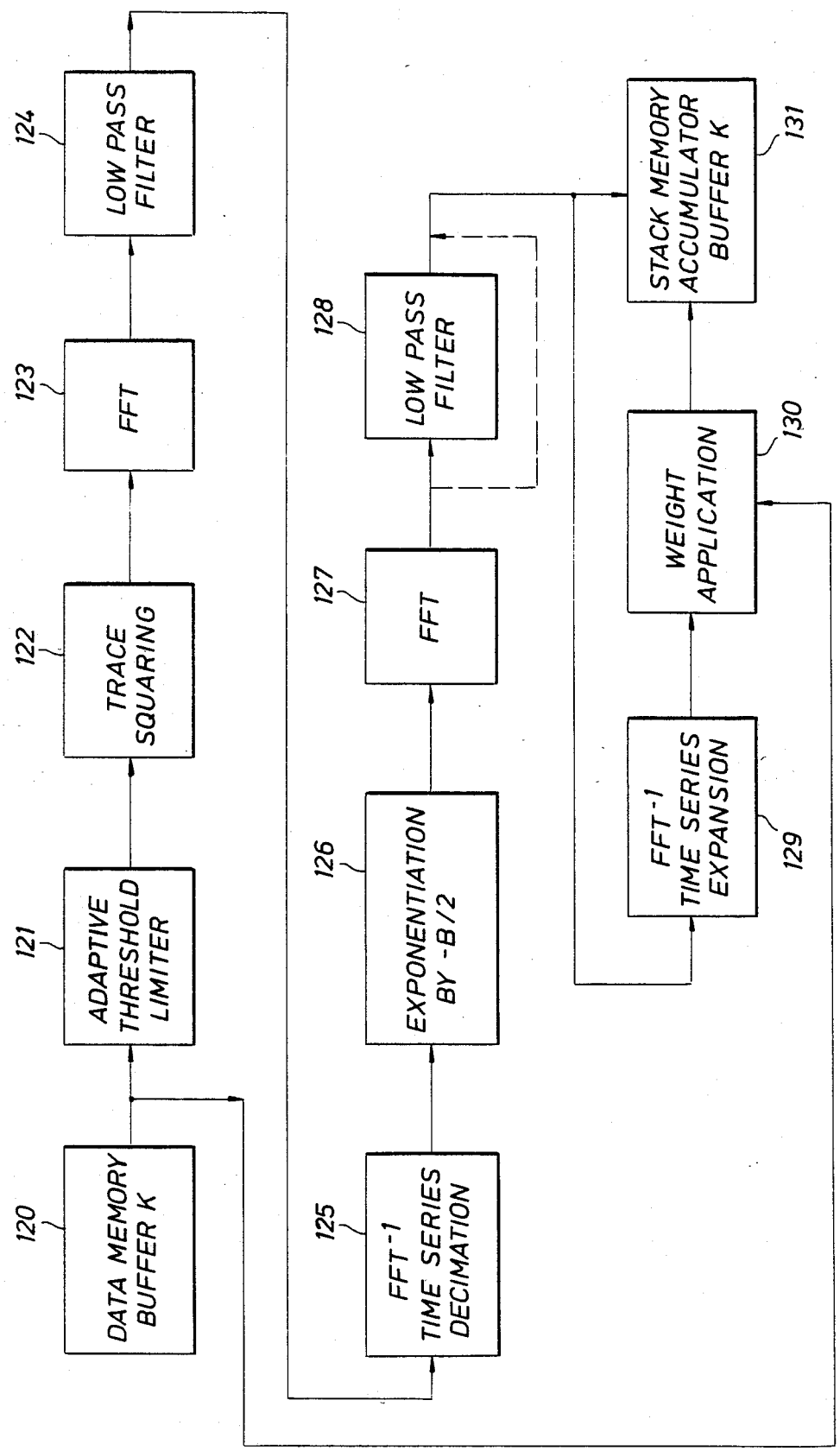
FIG. 5 is a block diagram of the noise suppressed stack weighting process in accordance with the present invention.
Figure 6:
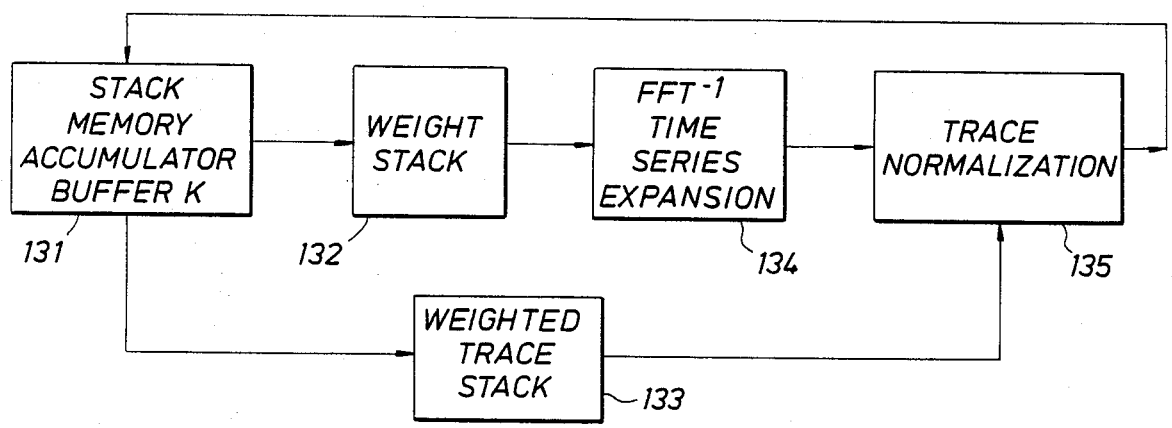
FIG. 6 is a block diagram of the noise suppressed stack normalization process in accordance with the present invention.

Now referring to FIGS. 5 and 6, a block diagram implementation of the above-described procedures are illustrated. The process of vertical stacking includes sequentially acquiring a plurality of input records, each one of which is the result of data acquistion associated with one injection of energy into earth's surface by the source. Furthermore, each such input record includes of a plurality of traces with each trace being associated with a single receiver.

During each input record cycle a typical trace k is stored in data memory buffer k 120. At the end of the record cycle, trace k is processed by the adaptive threshold limiter 121 for the purpose of removing anomalously large spikes. Such spikes would typically be due to digital acquisition faults, atmospheric disturbances or the location of a noise source near to the receiver. The output of the adaptive threshold limiter 121 is then squared at block 122 to obtain a time series corresponding to the instantaneous power at each sample time. The Fast Fourier Transform 123 is then applied to the resultant time series to obtain the corresponding complex frequency series. This result is then subjected to low pass filter 124 which has the effect of a finite time integrator on the instantaneous power times series. The output of low pass filter 124 is then the complex frequency spectrum of a time series that estimates the energy that is local to corresponding sample times with the input trace $G_i(t)$. The inverse Fast Fourier Transform is applied in block 125 to transform this spectrum back to the time domain. The size of the inverse FFT at this point is reduced to include only the samples of the spectrum that still contain energy after low pass filter application in filter 124. The reduction or truncation of this spectrum has the equivalent effect of increasing the time sampling interval in the output of inverse FFT 125 and hence the output is decimated in time. The resultant time series is then exponentiated in block 126 by a factor equal to $-B/2$. This has two effects, the first being that multiplicative inversion is performed on each sample of the time series. The second effect is that compensation is made for exponents other than 2. The forward Fast Fourier Transform at block 127 then transforms the resulting time series back to the frequency domain using an FFT size equivalent to that of inverse FFT 125. Low pass filter 128 is then optionally reapplied to eliminate high frequencies generated by the nonlinear operation of exponentiation in block 126. The inverse Fast Fourier Transform at block 129 is then applied. The size of this inverse FFT corresponds to the size of forward FFT 123 so that the resulting time series is returned to the original sampling interval of trace $G_i(t)$ in data memory buffer 120. The resulting weight function is then multiplied at block 130 by trace $G_i(t)$ from data memory buffer 120. This result is then added to the previous contents of corresponding locations in stack memory 131. The complex spectral output of low pass filter 128 is also added to reserved locations within stack memory accumulator 131 for the purpose of normalizing the weighted trace stack after the plurality of input traces have been weighted and accumulated into stack memory buffer k 131.

After weighting of the plurality of input traces is completed, the weight stack 132 and weighted trace stack 133 are withdrawn from stack memory accumulator buffer k 131, as shown in FIG. 6. The weight stack, which is in the complex frequency domain, is then transformed via inverse Fast Fourier Transform 134, which is of the same size as inverse Fast Fourier Transform 129, and as such, the resulting time series also has the same time sampling interval as the plurality of input traces obtained from data memory buffer k 120. The weighted trace stack 133 is then divided 135 by this time series so that the relative amplitude of signal in the final weighted and normalized stack trace is consistent with the signal found in each of the plurality of input traces $G_i(t)$. The result is then stored back into stack memory accumulator buffer k 131.

Figure 7A:
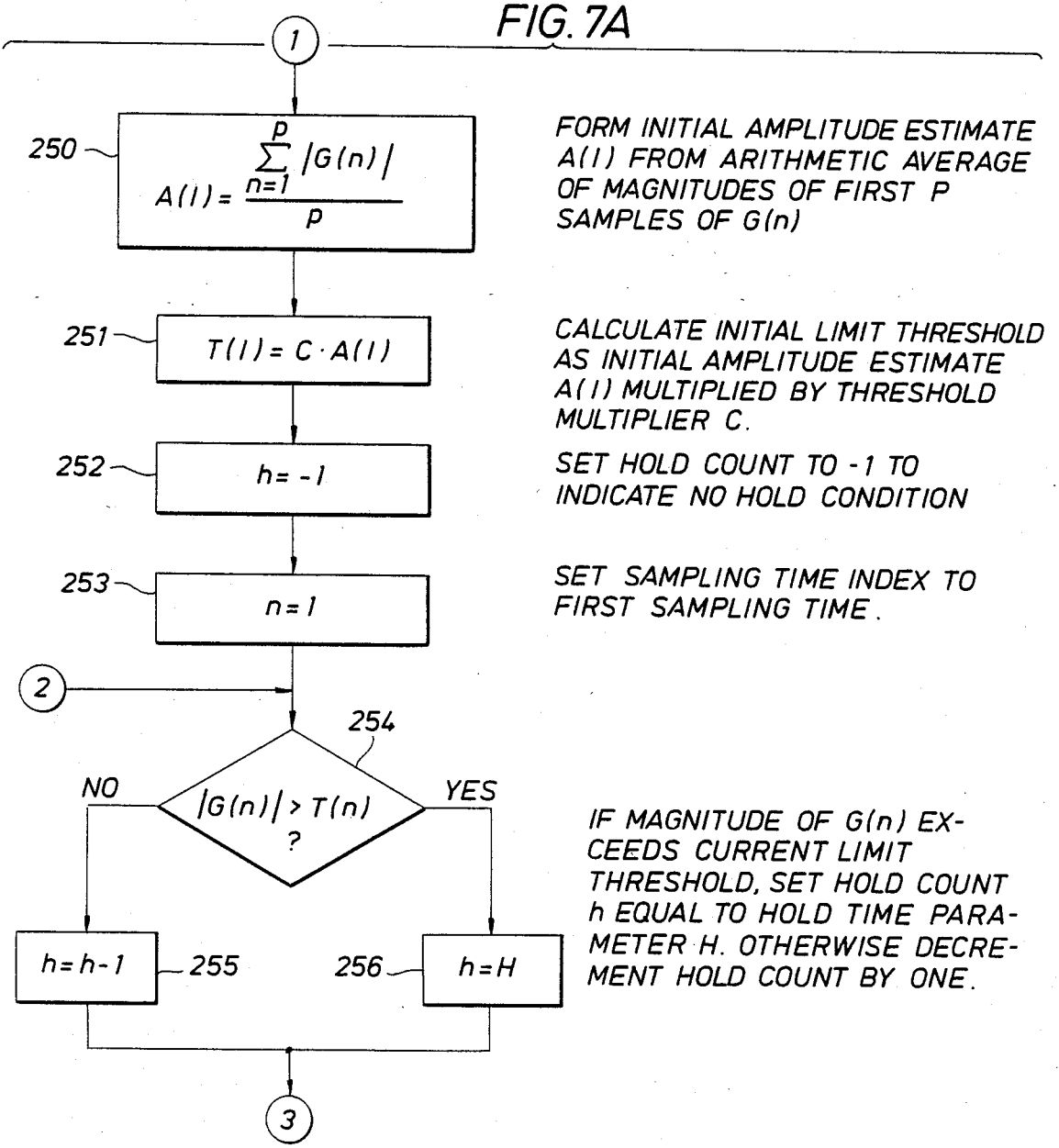

The following is a description of all operators, parameters and variables used to described the adaptive threshold limiter process in the process flow diagram of FIG. 7:

| Operator name | Description |
| --- | --- |
| min[...] | function that returns the minimum value from a list of arguments. |
| sign[...] | function that assumes the value +1 if its argument is positive or zero or the value −1 if its argument is negative. |

| Parameter of variable Name | Description |
| --- | --- |
| n | running index used to specify sampling time. |
| N | total number of sampling times within input trace G(n). |
| G(n) | N length time series of input trace samples. |
| G'(n) | N length time series of amplitude limited trace samples. |
| A(n) | variable containing trace amplitude estimate at sampling time n. |
| T(n) | variable containing limit threshold at sampling time n. |
| P | parameter indicating number of samples of G(n) to be |

| | |
|---|---|
| | used in forming initial amplitude estimate A(1). |
| C | threshold multiplier constant used to obtain threshold T(n) from amplitude estimate A(n). |
| D | limit multiplier used to establish the current limit value D × A(n) at sampling time n. |
| h | filter hold count variable used to determine the status and duration of the filter hold condition. The filter hold condition exists if h is zero or positive. Otherwise, the filter is allowed to track changes in trace amplitude. |
| H | integer parameter specifying the value to which variable h is set whenever G(n) exceeds the value of T(n) at the n'th sampling time. |
| α | parameter specifying adaptive filter time constant. |

The overall strategy of the adaptive threshold limiter algorithm is to limit the magnitude of trace samples based upon a running estimate A(n) of the trace's average amplitude prior to sampling time n. With certain exceptions, the averaging technique has the characteristics of a simple first order recursive filter. The first exception is that samples of trace G(n) whose magnitudes exceed the limit threshold T(n) at sampling time n are not allowed to influence the output of the filter and, hence, do not influence the amplitude estimate A(n). Furthermore, no samples of trace G(n) are allowed to influence the amplitude estimate within a specified number of samples after an out-of-limit condition. The provision of this filter's hold feature is to allow uniform limiting across a series of amplitude anomalies that could otherwise cause the amplitude estimate and, hence the limit threshold, to grow undesirably.

For a given input trace G(n), the adaptive threshold limiter process begins by establishing an initial amplitude estimate A(1) of the trace for sampling time number 1. In the current embodiment, this estimate includes a simple arithmetic average 250 of the magnitudes of the first P samples in G(n). Another estimator such as the median value of the magnitudes of the first P samples could be used instead. The initial limit threshold T(1) 251 is formed by multiplying A(1) by threshold multiplier parameter C. Prior to processing the N samples of G(n), the hold count h 252 is set to a value of −1 indicating the absence of the hold condition and sampling time index 253 is set to one to indicate the first sampling time. Upon entering the sample processing loop the magnitude of G(n) 254 is compared to the current limit threshold T(n) for sampling time n. If |G(n)| exceeds T(n) the hold count h 256 is reset to a value equal to hold time parameter H. Otherwise, h is decremented by one to $h = h - 1$ 255 to mark the occurrence of a within-limit sample. Hold count h 255 or 256 is then compared to zero in comparison step 257. If h is greater than or equal to zero, the hold state exists and hence the new value A(n+1) is set equal in step 258 to the current estimate A(n). Furthermore, the magnitude of sample G(n) is limited in step 259 to a value which is less than or equal to the value D×A(n) and placed into output sample G'(n) while preserving its original sign. If h is less than zero, the hold state does not exist and A(n+1) is set equal in step 260 to a weighted combination of A(n) and the magnitude of the trace sample G(n) at sampling time n. Furthermore, the sample G(n) is passed through in step 261 as output sample G'(n) unchanged. The form of the equation in step 260 will be recognized as that of a single-pole, auto-regressive filter with a time constant of α.

The limit threshold T(n+1) for the next sampling time is then calculated from A(n+1) by multiplication step 262 by threshold multiplier parameter C. Sampling time index n is incremented in step 263 and compared in step 264 to the number of sampling times N. If n is less than or equal to N, the sequence returns to the top in step 252 of the sample processing loop, from which point the above process is repeated for the next sample. Otherwise, the processing of trace G(n) is terminated.

Figure 8:
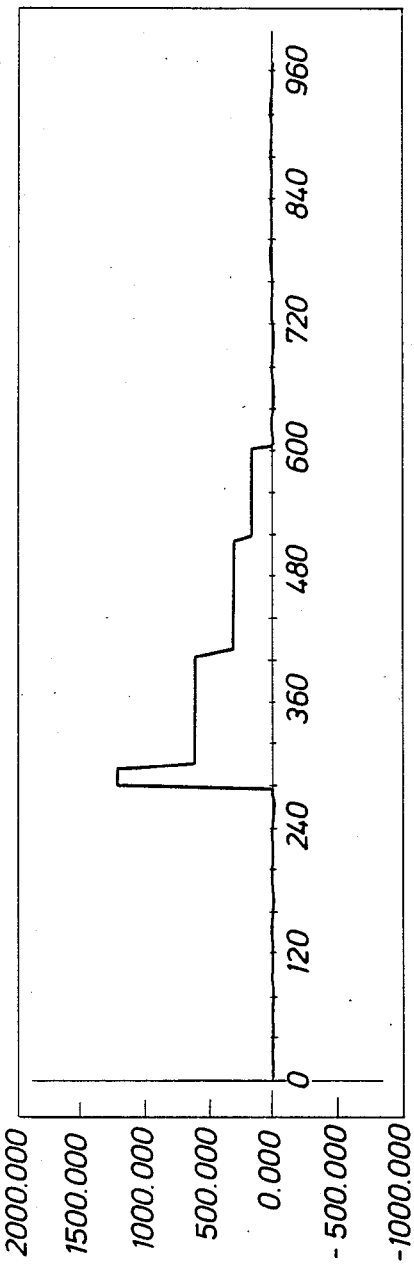
FIG. 8 is a waveform diagram demonstrating the application of the adaptive threshold limiter procedure to a noise burst induced by recording system errors.
Figure 8:
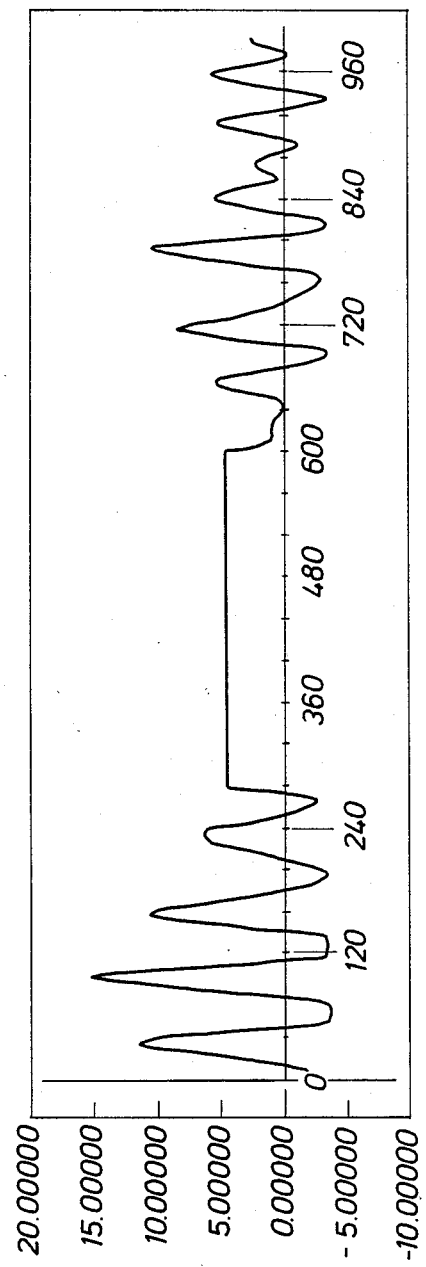
Figure 9:
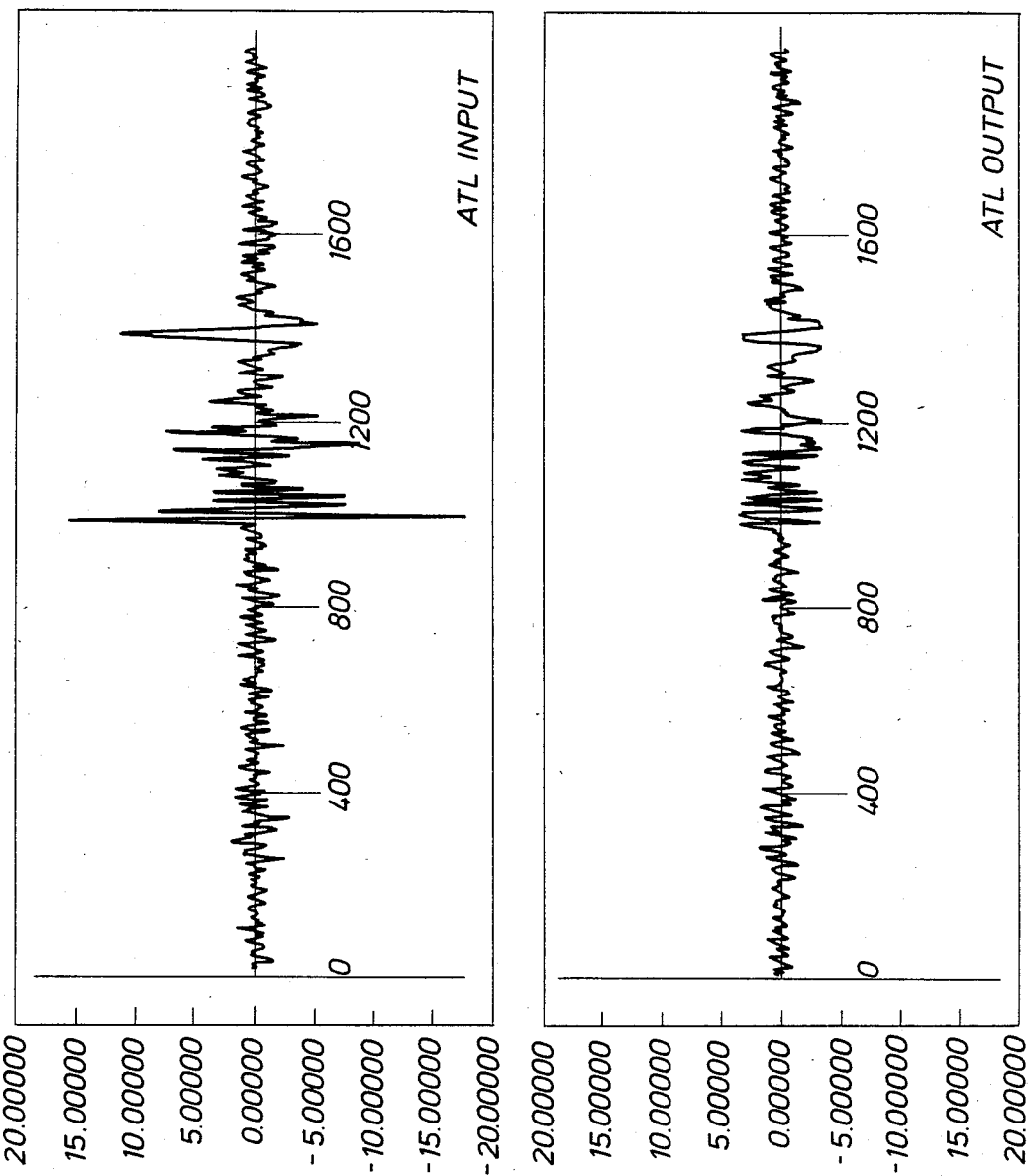
FIG. 9 is a waveform diagram demonstrating the application of the adaptive threshold limiter procedure to a noise burst generated by an environmental noise source.

Two test cases for the adaptive threshold limit procedure are shown in FIGS. 8 and 9. In both cases the filter time constant $T_f$ is set to 50 milliseconds and the threshold multiplier C is set to 6.

FIG. 8 demonstrates its application to a large noise burst caused by digital errors within the recording system. Due to the fact that limit multiplier D is set to one, the noise burst is limited to the value of the amplitude estimate A at the time of burst onset when the trace amplitude first exceeds the threshold function T.

FIG. 9 demonstrates the application of the adaptive threshold limiter to a moderately sized noise burst generated by an acoustic disturbance in the recording environment. In this case, the value of the limit multiplier D is equal to the value of the threshold multiplier C so that the burst is limited to the value of the threshold function T for the duration of the burst. It should be noted that the noise burst contains samples that fall within the threshold limits as well as those outside the threshold limits. Absence of the procedure's hold feature would cause both the amplitude estimate A and the threshold function T to grow undesirably throughout the noise burst due to the fact that the filter used to obtain the amplitude estimate would be influenced by all within-limit samples.

FIGS. 8 and 9 may also be used to demonstrate the preferred method of using the adaptive threshold limiter in conjunction with the noise suppression stacking procedure above. Note that in FIG. 8 the noise has been limited to a value approximately equal to the average of the trace amplitude prior to the burst, whereas in FIG. 9 the noise has been limited to a value equal to the threshold function at the time of burst onset. It should be observed that since the above suppression procedure weights traces inversely to their amplitudes, the burst of FIG. 8 will be undesirably accentuated by the weighting, in contrast to the burst in FIG. 9, which will receive proper treatment. In other words, it is desirable to limit noise bursts only to the extent that it is necessary to prevent aliasing effects in the weight computation and then let the suppression stacking perform its function of further limiting the burst.

While particular embodiments of the invention have been shown, it will be understood that the invention is not limited thereto. Many modifications may be made, which will become apparent to those skilled in the art. For example, it is assumed that the Fourier Transform steps can be efficiently performed using Fast Fourier Transform (FFT) procedures. These steps can each alternatively be performed using a Fast Hartley Transform (FHT) procedure instead or any other computationally efficient means of computing the forward and inverse Discrete Fourier Transforms.

What is claimed is:

1. The method of developing a weighted trace stack, comprising for each respective one of an ensemble of input traces for producing respective resultant weighted traces, sampling and squaring each sample of each input trace to produce a time series of corresponding instantaneous power values, transforming said series of instantaneous power values to the frequency domain, thereby producing an energy frequency spectrum, low pass filtering said energy frequency spectrum to form a time varying estimate of the energy of the said input trace time series, thereby producing a filtered energy spectrum, truncating said filtered energy spectrum to produce a truncated energy frequency spectrum for the purpose of decimating the corresponding time domain function, transforming the said truncated energy frequency spectrum to the time domain, thereby producing a decimated energy envelope, the sampling interval therefor being at a larger interval than the original digital sampling interval of said input trace, calculating the decimated weight function from the decimated energy envelope by exponentiating each sample of the said decimated energy envelope by a factor equal to $-B/2$, where B is the exponential bias factor, transforming the said decimated weight function to the frequency domain to produce a weight function frequency spectrum, low pass filtering said weight function frequency spectrum to eliminate higher frequencies caused by said exponentiation, thereby producing a filtered weight function frequency spectrum, expanding said filtered weight function frequency spectrum to the size of said energy frequency spectrum by converse padding to reverse the said truncation of the decimating step, thereby producing an expanded weight function frequency spectrum, transforming said expanded weight function frequency spectrum to the time domain to produce a weight function having a sampling interval equal to the sampling interval of said input trace, and multiplying said input trace by said weight function to produce a weighted trace; and adding the respective weighted traces to produce a weighted trace stack.

2. The method of suppressing noise from a plurality of related seismic traces including noise, comprising developing a weighted trace stack, including for each respective one of an ensemble of related input traces for producing respective resulting weighted traces, sampling and squaring each sample of each input trace to produce a time series of corresponding instantaneous power values, transforming said series of instantaneous power values to the frequency domain, thereby producing an energy frequency spectrum, low pass filtering said energy frequency spectrum to form a time varying estimate of the energy of the said input trace, thereby producing a filtered energy frequency spectrum, truncating said filtered energy frequency spectrum for the purpose of decimating the corresponding time function, thereby producing a truncated energy frequency spectrum, transforming the said truncated energy frequency spectrum to the time domain to produce a decimated energy envelope, the sampling interval therefor being at a larger interval than the original digital sampling interval of said input trace, calculating the decimated weight function from said decimated energy envelope by exponentiating each sample of the said decimated energy envelope by a factor equal to $-B/2$, where B is the exponential bias factor, transforming said decimated weight function to the frequency domain to produce a weight function frequency spectrum, low pass filtering said weight function frequency spectrum to eliminate higher frequencies caused by said exponentiation, thereby producing a filtered weight function frequency spectrum, expanding said filtered weight function frequency spectrum to the size of said energy frequency spectrum by converse padding to reverse the effects of the spectral truncation of the decimating step, thereby producing an expanded weight function spectrum, transforming said expanded weight function spectrum to the time domain to produce a weight function having a sampling interval equal to the sampling interval of said input trace, and multiplying said input trace by said weight function to produce a weighted trace; and adding the respective said weighted traces to produce a weighted trace stack, and adding said respective filtered weight function frequency spectra to develop a weight stack frequency spectrum;

expanding said weight stack frequency spectrum to the size of said energy frequency spectrum by converse padding to reverse the truncation caused by the decimating step, thereby producing an expanded weight stack frequency spectrum, transforming said expanded weight stack frequency spectrum to the time domain to produce a weight stack having a sampling interval equal to the sampling interval of said input trace; and dividing said weighted trace stack by said weight stack at each of the sampling occurrences of the original said input traces to produce an optimized stack trace, the signal component of which is substantially the same as the signal component common to all said input traces.

3. The method of computing and applying weight functions to each one of an ensemble of input traces to produce a resultant weighted trace for subsequent addition to a weighted trace stack, which comprises sampling and squaring each sample of each input trace to produce a time series of corresponding instantaneous power values, transforming said series of instantaneous power values to the frequency domain, thereby producing an energy frequency spectrum, low pass filtering said energy frequency spectrum to form a time varying estimate of the energy of said input trace time series, thereby producing a filtered energy frequency spectrum, decimating said time varying estimate by truncation of said filtered energy frequency spectrum, thereby producing a truncated energy frequency spectrum, transforming said truncated energy frequency spectrum to the time domain to produce a decimated energy envelope, the sampling interval of which is at a larger interval than the original digital sampling interval of said input trace, calculating the decimated weight function from the decimated energy envelope by exponentiating each sample of said decimated energy envelope function by a factor equal to $-B/2$, where B is the exponential bias factor, transforming said decimated weight function to the frequency domain to produce a weight function frequency spectrum, low pass filtering said weight function frequency spectrum to eliminate higher frequencies created by said exponentiation, thereby producing a filtered weight function frequency spectrum, expanding said filtered weight function frequency spectrum to the size of said energy frequency spectrum by converse padding to reverse the sub-sampling truncation caused by the decimating step, thereby producing an expanded weight function frequency spectrum, transforming said expanded weight function frequency spectrum to the time domain to produce a weight function having a sample interval equal to the sampling interval of the said input trace, and multiplying said input trace by said weight function to produce a weighted trace.

* * * * *